T861054

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1356

708,499

ACIDIC RESINS DERIVED FROM POLYMERS OR COPOLYMERS OF CONJUGATED DIOLEFINS

Gazi Basher Mourad Dickakian, Oxford, England
(No. 8, Ar. Van Goolen, Brussels 15, Belgium)

Filed Feb. 26, 1968. Published Apr. 29, 1969
Claims priority, application Great Britain, Feb. 27, 1967, 9,521/67
Int. Cl. C08f *29/08, 27/00, 27/25*
U.S. Cl. 260—78.5
No Drawing. 8 Pages Specification

Acidic resins are prepared by reacting a high 1,4-homo- or copolymer of a conjugated diene (e.g. butadiene) with an $\alpha,\beta$-unsaturated dicarboxylic compound (e.g. maleic anhydride). The resultant adduct (substantially soluble in aqueous ammonia) is partially hydrogenated using standard hydrogenation conditions (e.g. 5 to 50 atm. $H_2$ using a nickel-on-kieselguhr catalyst). Generally, 10 to 90% of the double bonds in the starting material will be saturated in the partial hydrogenation step.

The acidic resins thus obtained may be oxidized, hydroxylated, formoxylated, epoxidized or reacted with amino- and/or hydroxyl-compounds if desired. Upon reacting the acidic resins with an alkaline material (e.g. ammonia), a water-soluble coating composition is obtained. These coating compositions are especially useful for electro-deposition and paint formulations.